Dec. 29, 1931.  N. M. BAKER  1,838,608
OPHTHALMIC MOUNTING
Filed Nov. 21, 1928
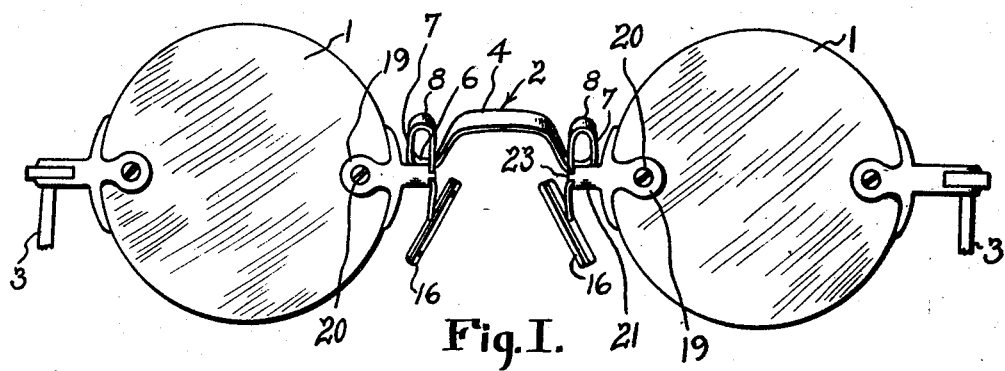
Fig. I.
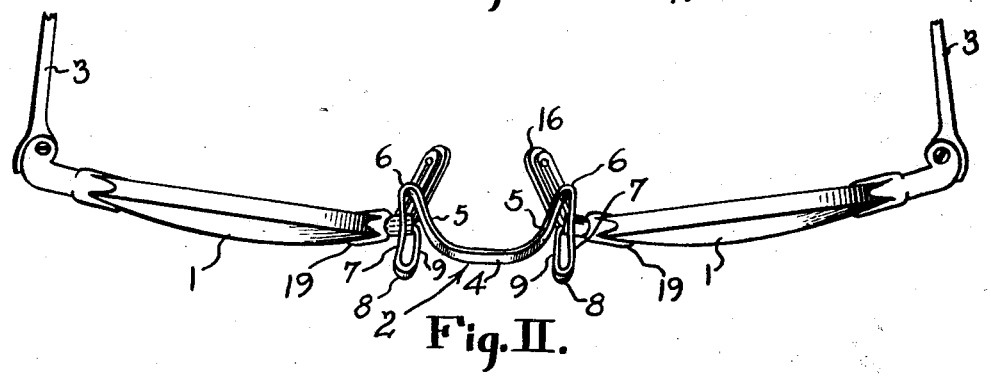
Fig. II.
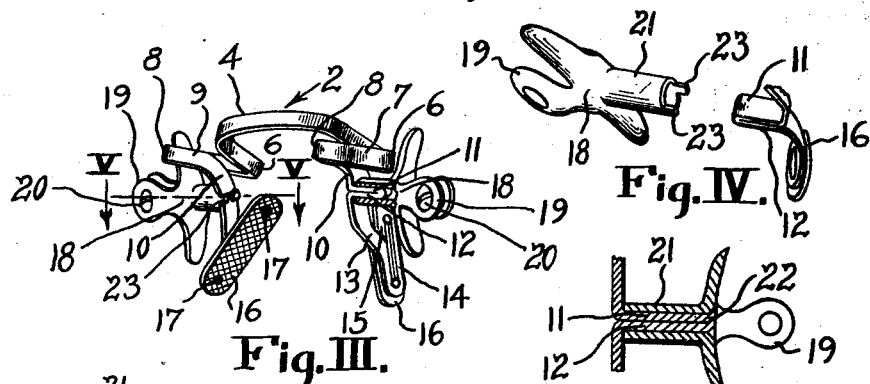
Fig. III.
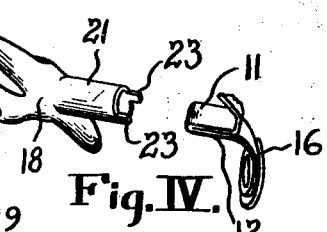
Fig. IV.
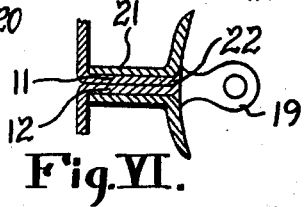
Fig. VI.
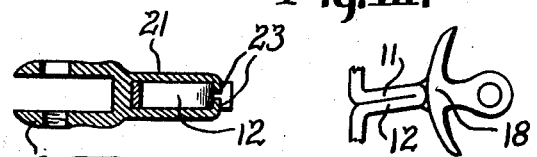
Fig. V.   Fig. VII.
Inventor
NELSON M. BAKER.
By Harry H. Styll
Attorney Patented Dec. 29, 1931

1,838,608

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed November 21, 1928. Serial No. 320,877.

This invention relates to improvements in ophthalmic mountings and has particular reference to a new and improved bridge, guard and stud construction for the same.

The principal object of the invention is to provide a bridge construction that is sufficiently rigid to hold the lenses of an ophthalmic mounting before the eyes and yet of such a resilient or flexible nature as to relieve the tendency of breaking out the lenses at the retaining screw roles formed therein for the bridge and temple connections.

Another object of the invention is to provide a resilient bridge having spring loops bent or looped in the direction of the flexing, thereby preventing distortion of the bridge and increasing the life of the spring.

Another object of the invention is to provide a novel connection of the bridge to the lens holding means.

Another object is to provide improved means for connecting the lenses of an ophthalmic mounting so that the distance between the same may be regulated and adjusted to meet various facial requirements.

Another object of the invention is to provide new and improved means of forming the guard arms, stud and bridge of an ophthalmic mounting of a single piece of material which shall be flexible and resilient in its nature and operation.

Another object is to provide simple, efficient and economical means for forming the parts of an ophthalmic mounting wherein the cost of material and assembling operations are greatly reduced.

Other objects and advantages of the invention will be apparent from the following description taken in connection with the accompanying drawings, and it will be apparent that many changes may be made in the arrangement of parts and details of construction without departing from the spirit of the invention as expressed by the accompanying claims. I, therefore, do not wish to be limited to the exact details and arrangements shown and described as the preferred forms only have been shown by way of illustration.

Referring to the drawings:

Fig. I is a front elevation of an ophthalmic mounting embodying the invention;
Fig. II is a plan view of Fig. I;
Fig. III is a perspective view of the bridge shown in Fig. I showing a portion in section;
Fig. IV is a fragmentary perspective view showing the stud box construction;
Fig. V is an enlarged section on line V—V of Fig. III;
Fig. VI is a fragmentary sectional view of a modified form of the invention;
Fig. VII is a further modification.

The rimless type of ophthalmic mounting has stood foremost in appearance as one of the most popular and highly recommended mountings. One of the most desirable features is that it is inconspicuous and affords a clear and unobstructed view. Although these mountings are very desirable as to appearance, there are certain defects that have caused a curtailment of their use, principally the breakage of lenses, particularly at the screw holes formed therein for the temple and bridge connections. The main difficulty to overcome, as in the case of spectacles, is the strain on the lenses caused by the leverage of the temples when they are bent outwardly to position the mounting on the face or remove the same therefrom. In the case of eyeglasses the leverage becomes active by grasping the lenses themselves, particularly in cleaning the lenses.

It is, therefore, the prime object of my invention to provide new and improved bridge means wherein the strain on the lenses will be greatly reduced or practically removed. This feature is accomplished by providing a bridge which is extremely resilient and flexible yet rigid enough to accurately support the lenses before the eyes.

Another feature of the invention is to provide a resilient bridge that will not distort during its use and which may be adjusted to meet various facial requirements.

Referring to the drawings, wherein similar reference characters denote corresponding parts throughout, the lenses 1 are connected centrally by the bridge 2 and in the case of a spectacle the usual temples 3 support the mounting on the face of the wearer.

Referring to Figs. I, II and III, the bridge 2 is preferably formed of flat spring material with a precious metal covering thereon. The flat spring material is bent to form the arch portion 4 to clear the nose or brow of the wearer and is then bent rearwardly at 5, then outwardly at 6, then forwardly at 7, then inwardly at 8, then rearwardly at 9, then downwardly at 10, then outwardly at 11, then inwardly at 12, then downwardly at 13, then upwardly at 14, and then downwardly terminating in the portion 15. The portions 13, 14 and 15 form a suitable support to which the guards 16 may be secured by the rivets or like means 17. The portions 11 and 12 form a stud support to which the lens holding means 18 may be secured. The lens holding means 18 is of the usual type comprising the clamps or straps 19 secured to the lenses 1 by a screw or like means 20. The lens holding means 18 may be secured to the stud support 12 by solder or similar means as shown in Fig. VII or the lens holding means may be provided with a tube 21 in which the stud arms 11 and 12 may be secured.

In the construction shown in Fig. VI the stud arms 11 and 12 are pressed into the tube 21 and the end 22 thereof is then headed over to secure the two together. In Figs. IV and V I have shown a further modification in which the tube 21 is provided with suitable ears 23 which may be bent inwardly over the inner ends of the arms 11 and 12 to secure the lens holding means to the bridge member. In both instances the tubular member 21 is secured to the lens holding means by solder or similar means prior to its attachment to the bridge member.

The operation of the device is as follows: when the temples 3 are grasped to remove the mounting from the face they are pulled outwardly to clear the ears and head. This outward movement causes the loops 6 and 8 of the bridge member to close or their proximate sides to be brought together. This arrangement lessens or practically removes the strain on the lenses at the temple and bridge connections and thereby greatly reduces the breakage of lenses as in instances in the past where rigid bridges were used.

Another feature of the resilient bridge is that the loops are formed substantially on a horizontal plane and are so formed that the flexing of the bridge causes the loops to close instead of being separated and thereby increases the resiliency of the spring and lessens the tendency to cause it to become broken or its tension to be reduced by repeated operations.

From the foregoing description it will be seen that I have provided simple, efficient and economical means for obtaining all of the advantages of the invention, particularly of providing adjustable means of a flexible shock or strain absorbing type for connecting the lenses of an ophthalmic mounting.

Having described my invention, I claim:

1. In a device of the character described, a bridge, stud and guard member comprising a flexible bent bar having an arched central portion extending rearwardly to a turn, said turn being adapted to permit adjustment in the distance between the lens attachments, then forwardly to a turn, said turn also assisting in the adjustment in the distance between the lens attachments, then rearwardly and downwardly to provide adjustment of the bridge arch with respect to the nose, outwardly and inwardly to form folded portions one above the other to provide an attachment for the lens holders, the said outwardly and inwardly extending portions engaging each other throughout the width of the material, thence downwardly, upwardly and downwardly to form a guard support, and a guard member secured to the guard support, the loops formed by the said bends being arranged so that substantially all of the flexing movements come along the lines of opening and closing the loops.

2. In a device of the character described, a bridge, stud and guard member comprising a flexible bent bar having an arched central portion extending rearwardly to a turn, said turn being adapted to permit adjustment in the distance between the lens attachments, then forwardly to a turn, said turn also assisting in the adjustment in the distance between the lens attachments, then rearwardly and downwardly to provide adjustment of the bridge arch with respect to the nose, outwardly and inwardly to form folded portions one above the other to provide an attachment for the lens holders, the said outwardly and inwardly extending portions engaging each other throughout the width of the material, thence downwardly to form a guard support, and a guard member secured to the guard support, the loops formed by the said bends all being arranged so that substantially all of the flexing movement comes along the lines of opening or closing the loops.

NELSON M. BAKER.